Aug. 15, 1939.  T. F. PEARSON  2,169,429
SKIMMING DEVICE FOR GLASS TANKS OR FURNACES
Filed April 29, 1937  5 Sheets-Sheet 1
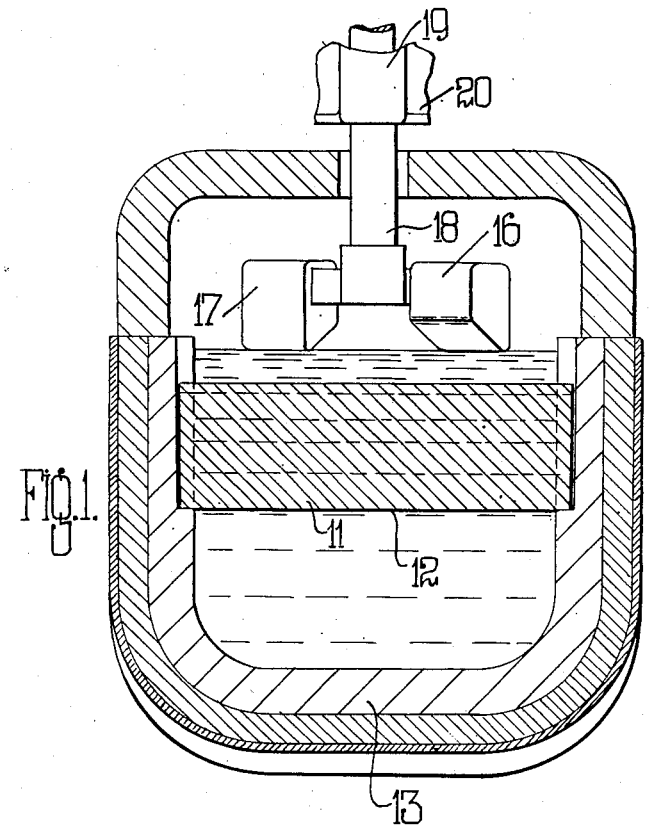
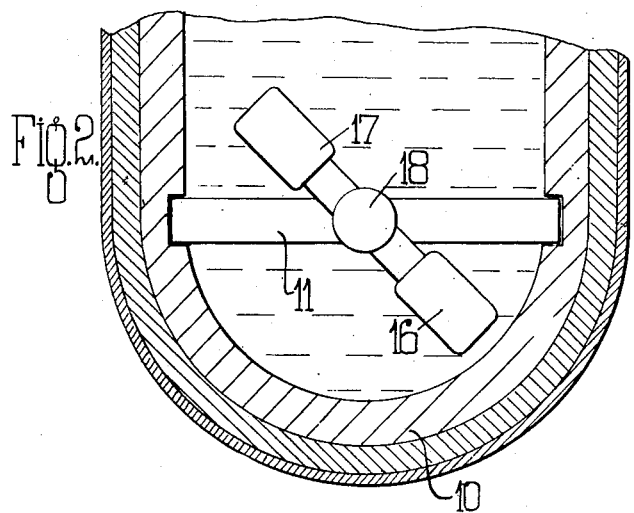

Aug. 15, 1939.   T. F. PEARSON   2,169,429
SKIMMING DEVICE FOR GLASS TANKS OR FURNACES
Filed April 29, 1937   5 Sheets-Sheet 2
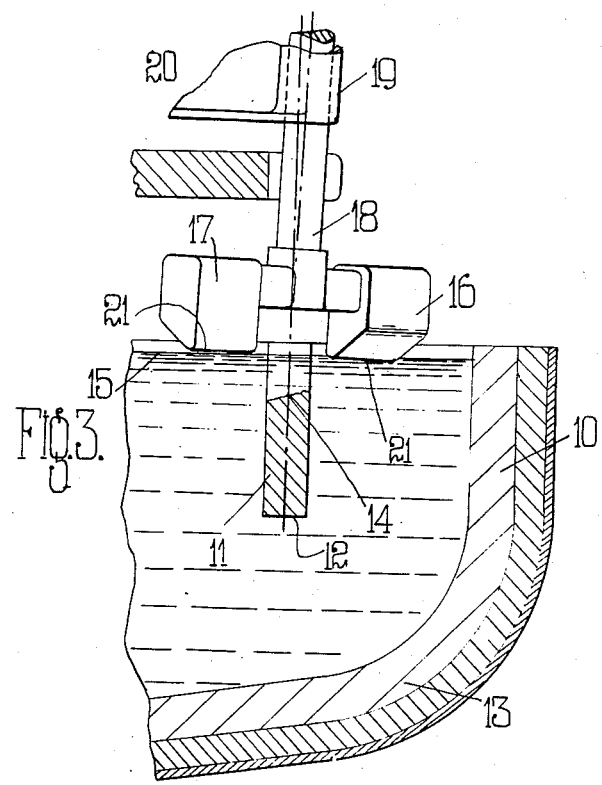
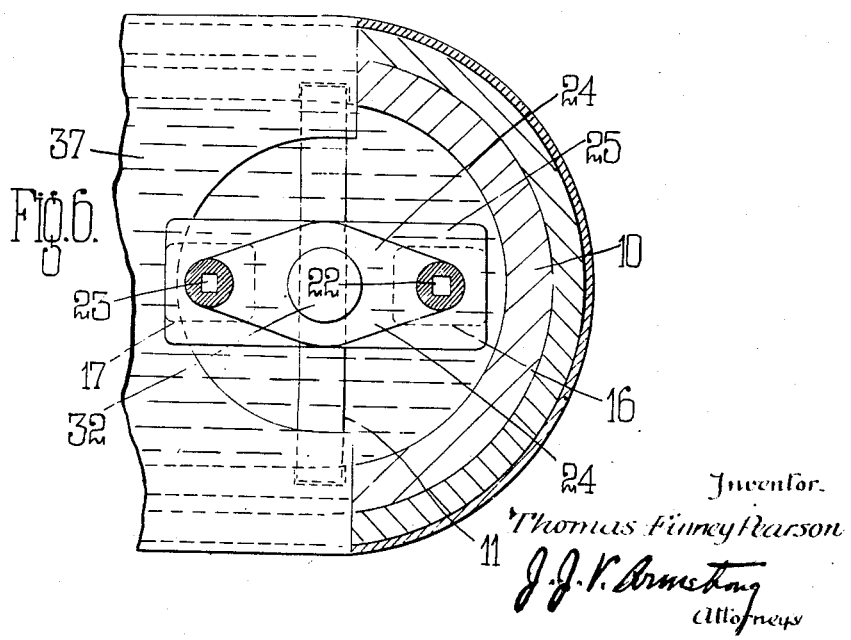
Inventor
Thomas Finney Pearson
J. J. V. Armstrong
Attorneys

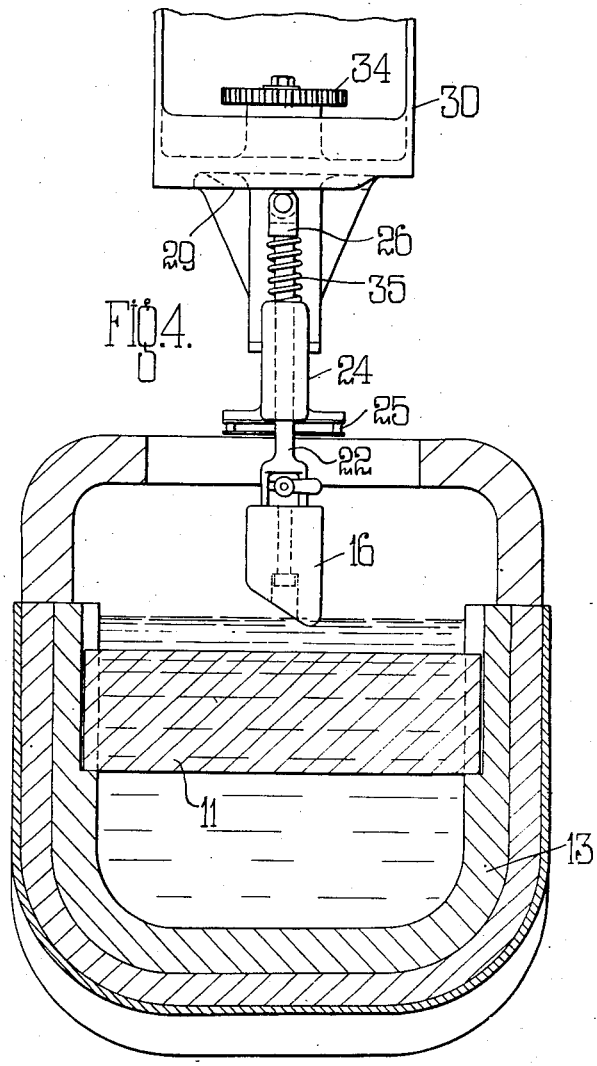

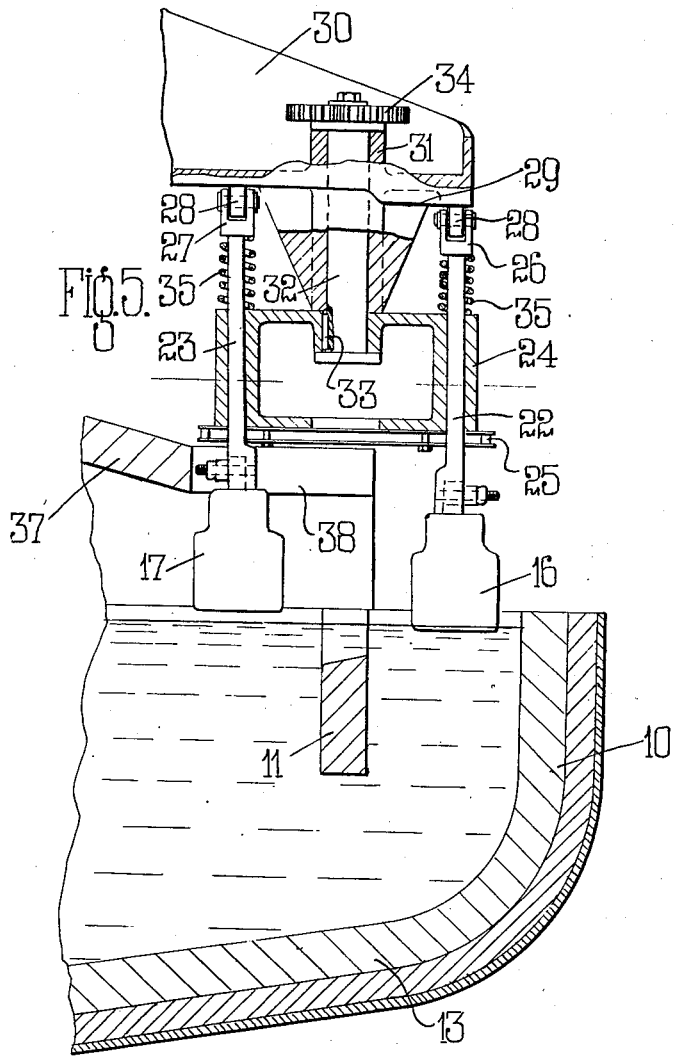

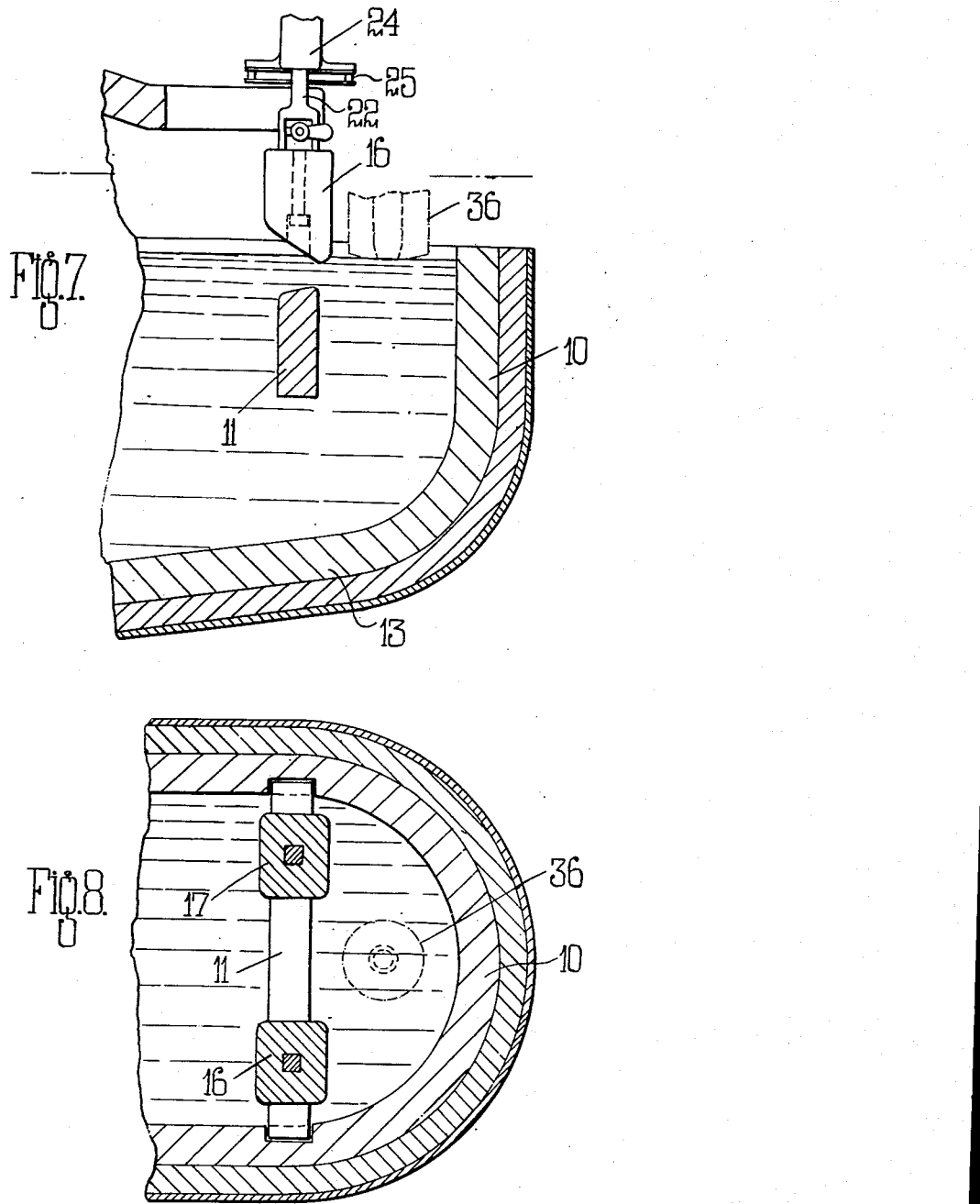

Patented Aug. 15, 1939

2,169,429

UNITED STATES PATENT OFFICE 2,169,429

SKIMMING DEVICE FOR GLASS TANKS OR FURNACES

Thomas Finney Pearson, Pontefract, England, assignor to Crown Cork & Seal Company, Inc., New York, N. Y., a corporation of New York Application April 29, 1937, Serial No. 139,806
In Great Britain May 2, 1936

7 Claims. (Cl. 49—56)

The present invention relates to skimming devices for glass tanks or furnaces and to the gathering of charges therefrom.

The object of the present invention is to provide relatively simple means for removing the upper stratum of relatively cold glass from the gathering area of a forehearth and for replenishing the void thus created by relatively hot glass and at the same time draining the removal means when out of the gathering area so as to prevent the return of relatively cold glass thereto.

According to the present invention a skimmer is adapted to rotate about an axis substantially coincident with a bridge which is located transversely of the forehearth and which extends from a position beneath the surface of the molten glass to a position above the base of the former, angular displacement of each skimming head on that side of the forehearth from which charges are picked up by a gathering head or mould being effected within the glass whilst on the opposite side of said bridge the skimming heads are angularly displaced above the surface of the glass for drainage purposes.

It will thus be seen that when a skimmer is displaced through the glass on one side of the bridge it causes the upper portion or relatively cold surface of the glass to be displaced over the bridge and out of range of the gathering head or mould whilst the void created thereby is taken up by glass passing beneath the bridge and then vertically upwards into the space traversed by the skimmer during its skimming operation. The upper edge of the bridge is inclined downwardly from front to rear to prevent return movement of the displaced glass otherwise than through the passage between the base of the bridge and the base of the forehearth.

The skimmer may be made up of one or more radially disposed heads, the arrangement being such that when a gathering head or mould descends into the molten glass to pick up a charge, each skimming head is outside the path of travel of the mould.

Each head in addition to being angularly displaced about an axis common to the heads may be dipped suddenly at one point of its travel into the glass and then elevated suddenly out of the glass but if desired, the axis of rotation of the skimming heads may be slightly inclined to the vertical so that during half their path of travel their lower edges lie within the molten glass and during the remainder such edges lie above the molten glass for drainage purposes.

The invention is more particularly described with reference to the accompanying drawings, in which—

Figure 1 is a transverse sectional elevation of a forehearth with one form of skimmer.

Figure 2 is a corresponding plan view.

Figure 3 is a corresponding side elevational view partly in section.

Figure 4 is a transverse sectional view of a modified form of construction with the skimming heads in one position.

Figure 5 is a corresponding side sectional elevation.

Figure 6 is a corresponding sectional plan.

Figure 7 is a side sectional elevation with the skimming heads in another position just leaving the gathering area.

Figure 8 is a corresponding sectional plan.

In the construction according to Figures 1–3 of the drawings, glass charges are adapted to be picked up by a gathering head or mould from within a gathering area between the front wall 10 of the forehearth and the refractory bridge 11, the base 12 of which lies above the floor 13 of the forehearth to leave a channel therebetween and the upper end of which is inclined downwardly from front to rear as shown at 14, the said upper end of the bridge lying wholly below the normal level 15 of the glass within the forehearth.

In the particular construction illustrated in these figures the skimmer consists of two skimming heads 16, 17, extending radially in opposite directions from the base of a spindle 18 which is rotatably mounted within a bearing 19 of a carrier member 20. The spindle 18 is slightly inclined to the vertical so that on rotation of said spindle the lower edges 21 of the skimming heads 16, 17, are displaced in a plane which is slightly inclined to the horizontal, said plane being inclined downwardly towards the gathering area between the front wall 10 of the forehearth and the bridge member 11. The height of the skimming heads 16, 17, is such that during rotation about the axis of the spindle 18 the base 21 of each skimming head 16, 17, lies within the glass during its arcuate traverse above the gathering area and lies out of contact with the glass during its complementary arcuate traverse above the glass on the rear side of the bridge 11. In this way, each skimming head 16, 17, during its traverse above the gathering area skims the upper stratum of glass therein and carries it over the bridge 11 into the mass of glass in rear of said bridge, the void thus created adjacent the upper surface of the glass in the gathering area being taken up by relatively hot glass which passes from a position in rear of the bridge member through the channel between the base 12 of the bridge member and the floor 13 of the forehearth and vertically upwardly within the gathering area. In addition, during the return path of travel of each skimming head out of contact with the glass in rear of the bridge, any glass which has accumulated on the skimming head is drained therefrom so that there is no tendency for relatively cold glass to return to the gathering area.

The timing of rotation of the skimming heads 16, 17, about the axis of the spindle 18 is such that when a gathering head or mould descends into the gathering area to pick up a charge of glass therefrom, there is no danger of contact between said gathering head and the rotating skimming heads. In other words, the gathering head is withdrawn out of the plane of revolution of the skimming head before either of these cross the vertical path of travel of the gathering head or mould.

In the construction shown in Figures 1-3 the axis of revolution of the skimming heads intersects the central transverse vertical plane through the bridge at a position above the bridge and substantially coincident with the normal level of glass within the forehearth.

In the modified form of construction illustrated in Figures 4-8 the skimming heads 16, 17, are respectively mounted at the base of spindles 22, 23, which are slidably mounted within a skimming arm bracket 24 at the base of which a fire-guard 25 is provided. The upper ends of the spindles 22, 23, are bifurcated at 26, 27, respectively to carry rollers 28 which engage with a cam track 29 of a stationary arm 30 which has a bearing member 31 for a rotating spindle 32, the base of which is keyed at 33 to the skimming arm bracket 24. The spindle 32 is rotated by a spur wheel 34 from any suitable source of power supply.

The cam 29 is so formed that on rotation of the spindle 32, the skimming arm bracket 24 and the spindles 22, 23, carrying the respective skimming heads 16, 17, the said skimming heads are lowered during their path of travel above the gathering area so that their lower edges 21 dip into the glass therein and are raised when leaving the gathering area so as to permit of drainage of relatively cold glass from the skimming heads when these lie above the forehearth in rear of the bridge 13.

The rollers 28 at the upper ends of the spindles 22, 23, are maintained in engagement with the cam 29 by springs 35 which extend between the bifurcated ends 26, 27, of the spindles 22, 23, and the skimmer arm bracket 24.

The forehearth is provided with a cover 37 which has an arcuate recess 38 formed at its front end to permit of revolution of the skimming heads 16, 17, and their spindles 22, 23, about the axis of the rotary spindle 32 which, as seen from Figure 5 of the drawings, is substantially vertical above the bridge 11.

It will thus be seen that the modified form of construction differs from the construction illustrated in Figures 1-3 solely by virtue of the fact that the base of each skimming head 16, 17, is rotated in two parallel horizontal planes as distinct from a plane which is slightly inclined to the horizontal. The result however is the same in that each skimming head skims the surface of the glass within the gathering area of the forehearth and is drained when displaced in an arcuate path above the glass in rear of the bridge.

The gathering head for picking up charges of glass from the gathering area is diagrammatically illustrated at 36 in Figures 7 and 8, gathering being effected while the skimming heads are in the position shown in Figure 8, that is to say they lie above the bridge. The rotation of the skimming heads preferably is continuous, but so long as the descent and ascent of the gathering head or mould 36 is timed correctly with the revolution of the skimming heads 16, 17, about the spindle 32 there is no danger of contact between the gathering head 36 and the skimming heads 16, 17.

I declare that what I claim is:

1. Apparatus for conditioning glass in a forehearth, comprising a refractory bridge spaced rearwardly from the front wall of the forehearth and extending transversely thereof with its base above the forehearth floor to form a channel therebetween and with its upper end below the normal level of glass within the forehearth, a skimmer and means for angularly displacing said skimmer along an arcuate path which crosses said bridge, said means serving to move the skimmer through said glass between said refractory bridge and the front wall of said forehearth and out of contact with said glass in rear of said bridge to skim the surface of said glass in front of said bridge and to permit drainage of glass from said skimmer in rear thereof.

2. Apparatus for conditioning glass in a forehearth, comprising a refractory bridge spaced rearwardly from the front wall of the forehearth and extending transversely thereof with its base above the forehearth floor to form a channel therebetween and with its upper end below the normal level of glass within the forehearth, a skimmer and means for revolving said skimmer about an axis slightly inclined to the vertical with the skimmer crossing the bridge upon each revolution and passing through said glass between said refractory bridge and the front wall of said forehearth and out of contact with said glass in rear of said bridge to skim the surface of said glass in front of said bridge and to permit drainage of glass from said skimmer in rear thereof.

3. Apparatus for conditioning glass in a forehearth comprising a refractory bridge spaced rearwardly from the front wall of the forehearth and extending transversely thereof with its base above the forehearth floor to form a channel therebetween and with its upper end below the normal level of glass within the forehearth, a skimmer, means for angularly displacing said skimmer about a vertical axis and along a path which has portions extending, respectively, forwardly of, rearwardly of and across the bridge, and cam means for lowering said skimmer into said glass during its angular displacement forwardly of the bridge to skim the surface of said glass in front of said bridge and for raising said skimmer out of contact with said glass during its angular displacement rearwardly of said bridge to permit drainage of glass from said skimmer in rear thereof.

4. Apparatus for conditioning glass in a forehearth comprising a refractory bridge spaced rearwardly from the front wall of the forehearth and extending transversely thereof with its base above the forehearth floor to form a channel therebetween and with its upper end below the normal level of glass within the forehearth and downwardly inclined from front to rear, a skimmer and means for displacing said skimmer in a circular path having portions extending, respectively, forwardly of, rearwardly of and across the bridge, said path being within said glass forwardly of said bridge and above the level of said glass rearwardly of said bridge to skim the surface of said glass in front of said bridge and to permit drainage of glass from said skimmer in rear thereof.

5. In combination, a forehearth having a forwardly disposed gathering area, a bridge spaced from the base of the forehearth and extending across the forehearth and constituting the rear transverse boundary of said area, a skimmer over the bridge and means for moving said skimmer in a circular path which lies within the glass in the gathering area to cause a circulation of hot glass to said gathering area exclusively by a flow upwardly from under said bridge, and which lies above the glass in rear of said bridge to permit of drainage of skimmed glass picked up by said bridge from said gathering area.

6. In combination, a forehearth having a forwardly disposed gathering area, a bridge extending across the forehearth, and submerged in the glass and constituting the rear transverse boundary of said area, a skimmer, means for supporting the same for revolution about an upwardly extending axis aligned with the bridge, means for moving said skimmer, and means included in said supporting means for lowering the skimmer into the glass forwardly of said bridge and for raising the same out of the glass rearwardly of the bridge.

7. In combination, a forehearth having a forwardly disposed gathering area, a bridge at the rear of the gathering area submerged under the surface of the glass and extending across the forehearth, a skimmer mounted for revolution about an axis extending upwardly from the bridge and inclined forwardly from a vertical line, means for revolving the skimmer about said axis to cause the skimmer to pass through the glass forwardly of the bridge and to move out of contact with the glass rearwardly of the bridge, thereby to skim the surface of the glass in the gathering area in front of the bridge and to permit drainage of glass from the skimmer rearwardly of the bridge.

THOMAS FINNEY PEARSON.